Patented Nov. 8, 1938

2,135,742

UNITED STATES PATENT OFFICE 2,135,742

REVERSED CYCLE HEATING SYSTEM

Kemper P. Brace and Robert B. P. Crawford, Washington, D. C.

Application April 27, 1935, Serial No. 18,685

REISSUED

MAY 26 1942

6 Claims. (Cl. 257—3)

This invention relates to air conditioning systems and more particularly to systems for heating and cooling a building by what is known as the reversed refrigerating cycle, and one of its objects is to reduce the cost of heating by such systems.

A further more specific object is to provide controlling mechanism for heating systems which will limit operation of the system at capacity load only to certain hours of the day.

Further objects and advantages will become apparent from the description which follows.

Figure 1:
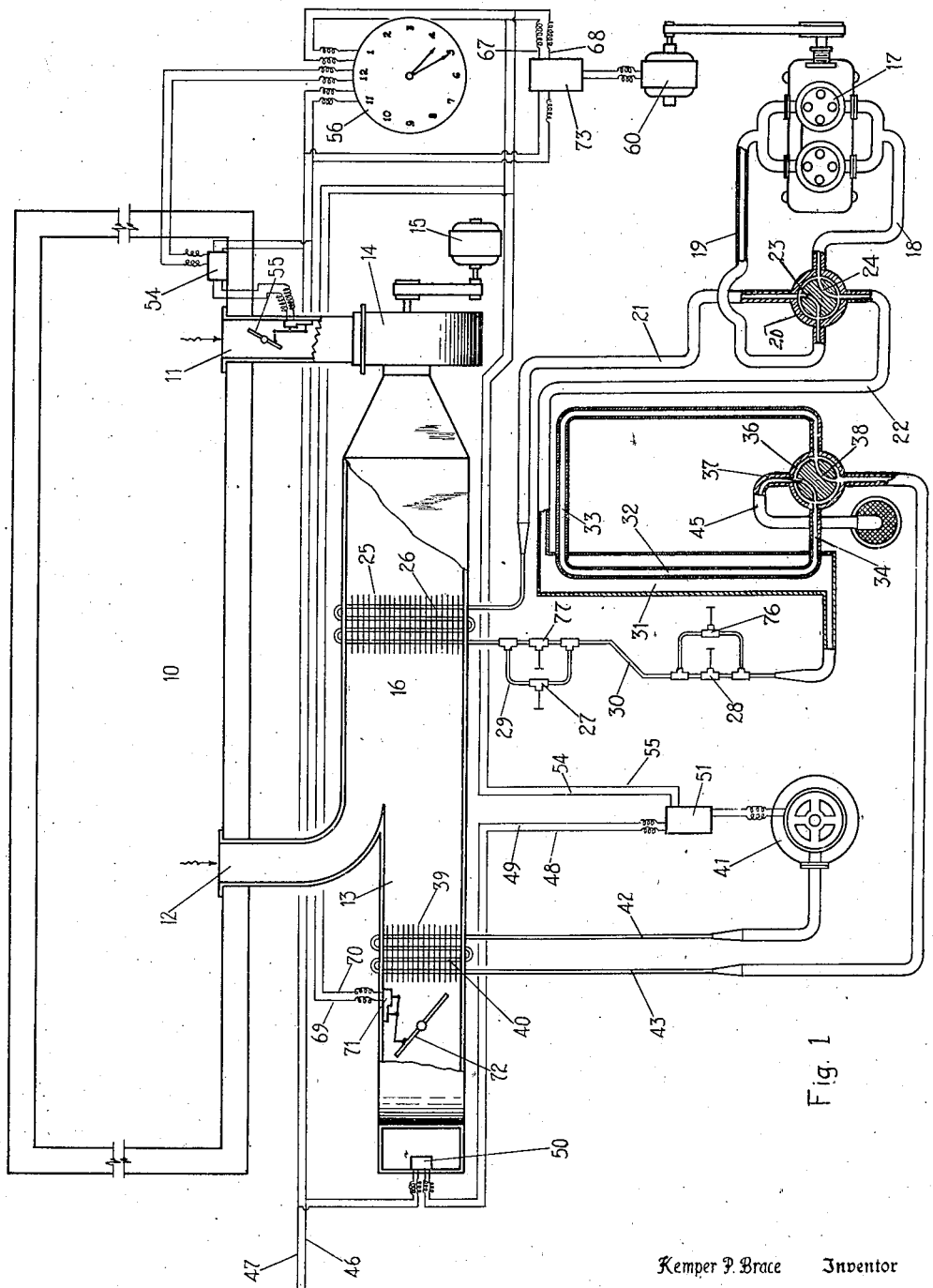
Figure 2:
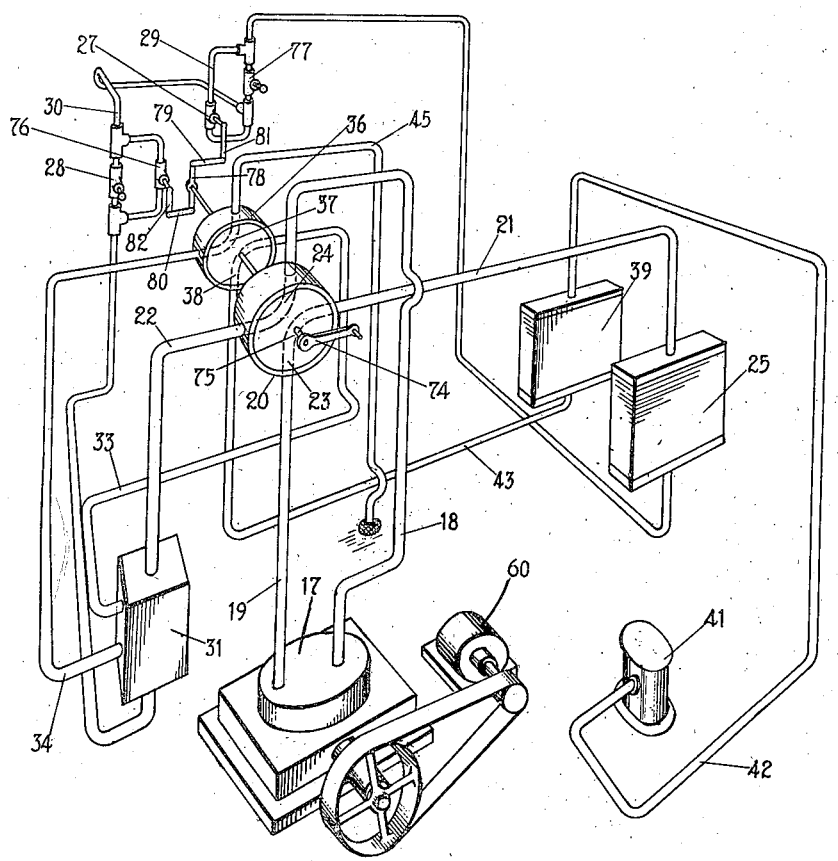

Referring to the accompanying drawings which are made a part hereof and on which similar reference characters denote the same parts thruout, Figure 1 is a perspective view of the system, and Figure 2 is a view of some of the details showing a single operating mechanism for changing from a heating to a cooling system.

In carrying out the objects of the invention, use is made of the mechanical heat pump known as the reversed refrigerating cycle. Refrigeration is an exchange of heat from one medium to another, resulting in the cooling of one and the heating of the other. The refrigerating cycle is essentially a heat pumping cycle which is used for removing heat from one body or medium at one temperature and discharging it into another body or medium at a higher temperature. As would be expected from the fundamental law of thermodynamics, the greater the temperature difference between the cold body or medium from which heat is removed and the body into which it is delivered, the greater is the amount of energy required to pump a unit quantity of heat from the cold body to the warmer body or medium.

The use of the refrigerating cycle for cooling a building is relatively simple. The heat of the room is taken up by some suitable medium as city water, well water, air or water from a cooling tower or spray pond. Heating a building by the refrigerating cycle, however, presents some difficulties. In the first place, under normal conditions, the heating load or heat pumping duty is higher during the heating season than is the corresponding cooling lead during the cooling season. In other words, it requires considerable more energy to heat a building when heat is required than it does to cool the building when cooling is required. In the second place, while a medium into which heat may be conveyed during the cooling season is always available, a suitable medium from which heat may be obtained for heating a building is not always available.

Our system provides means for making available a medium from which heat may be obtained at very low cost. We propose to make use of the heat in artesian or underground well water for supplying heat necessary for heating a building by the refrigerating cycle. This medium is ideal because it is inexpensive, plentiful, easy to handle and because in practically all localities which require winter heat its temperature is constant thruout the year, at values ranging from 48 to 65 degrees F. Due to the high temperature of artesian well water, the temperature gradient against which the refrigerating cycle must pump heat is low, hence the overall efficiency of the system is high.

We propose to use the artesian water mentioned above not only as a source of heat for the refrigerating cycle but also as a means for reducing the total heat load required for heating the building. We do this by using the well water to warm the incoming air supplied to the building. By raising the temperature of cold air to within a few degrees of the temperature of the water, the additional heat necessary to raise the air to the desired temperature is considerably reduced. In heating a building, obviously, it is necessary to supply only sufficient heat to take care of heat losses. These heat losses are due to two principal causes. First, by transmission of heat by conduction thru the walls of the building, the glass, etc. With well constructed building this loss may represent fifty per cent of the losses. The other loss is due to the infiltration of air thru the cracks in doors, windows and other places. The amount of this infiltration depends upon the type of construction of the building, the amount of the building exposed to the wind, the velocity of the wind, etc. The maximum infiltration under worst conditions amounts to from one half to one and one half air changes per hour. In order to maintain the room or building at the desired temperature this air must be heated at this rate.

It has been found that infiltration can be prevented to a large degree by supplying enough outside air to the building thru the ventilating system to create an internal air pressure equal to the external wind pressure on the windward side of the building. In general the amount of air necessary to be supplied to a building to prevent infiltration is equal to the amount which would enter by infiltration if no outside air were supplied, that is, from one half to one and one half air changes per hour. If this entering air can be heated at little or no cost, considerable economy will be effected. As stated we propose to heat this air by artesian well water. This can be done because in most climates where the outside temperature may go as low as zero degree, the temperature of the available artesian water may be as high as 65 degrees F. With this water at this temperature it is possible to heat the incoming air at least to 55 degrees F. As will be apparent this takes care of a large part of the heat load for the building.

We propose to reduce the cost of operation of the system by reducing the operation of the system at certain times in the day during which periods the greatest demands are made upon the power system. This enables us to operate at less cost for power.

Wherever electricity is being used in large quantities, the rate of charge for current is usually based on two things, namely, the energy charge based upon the actual amount of current used, and the demand charge based upon the maximum rate at which the current is used at a given instant. Usually this demand charge is figured as so much per kilowatt of maximum demand which occurs on the power company's peak period. If the current consumption can be arranged so that little or no energy is consumed between hours limiting the company's peak period, the demand charge can be greatly reduced.

In the District of Columbia, for example, the demand charge for current consumed between the hours of 4:30 and 8:30 p. m. is $2.00 per month per kilowatt of maximum demand, whereas the demand charge for current consumed at other times of the day is only $1.00 per month per kilowatt of maximum demand. Therefore, it would be advantageous to arrange the system so that not more than one-half of the normal current consumption should be used between the hours of 4:30 and 8:30 p. m. in the District of Columbia. This invention provides means for automatically reducing the consumption of current during certain periods of the day, which periods may represent the peak demands made upon the power system.

In the drawings numeral 10 indicates a room to be heated or cooled having ducts 11 and 12 thru which air is supplied to and drawn from the room by fan 14 which is operated by motor 15. Fresh air from the outside of the building is supplied thru duct 13. The fresh air and the returned air are mixed in the conditioning chamber 16 and discharged into the room.

At 17 is shown a refrigerant compressor which is operated by a motor 60. Numerals 18 and 19 indicate inlet and discharge passages to and from the compressor. Refrigerating fluid to and from the compressor passes thru valve 20, the position of which valve determines whether the gas from the compressor passes thru line 21 or 22. When operating as a heating system, the valve will be in the position shown in Figure 2, in which case the passage 23 of the valve will connect discharge line 19 with pipe 21 and the passage 24 will connect suction pipe 18 with pipe 22. Positioned in the conditioning chamber 16 is a heat exchange unit 25 consisting of a coil 26 thru which hot gas from the compressor passes. The cool air passing thru chamber 16 passes over the coils 26 and condenses the gas therein, the heat of condensation being taken up by the air. Liquid refrigerant is returned thru pipe 29, valve 27, pipe 30 and expansion valve 28 to the evaporator 31. The expanded refrigerant is warmed in the shell 31 by water passing thru pipes 33, 34 and coil 32. The direction of flow of water thru the coil and pipes 33 and 34 is determined by the position of the valve 36 as will later appear. From the evaporator, refrigerant passes thru pipe 22 back to the compressor.

A heat exchange unit 39 is positioned in the duct 13 for warming the incoming air by artesian water. This unit includes a coil 40 thru which water is circulated by a pump 41 and pipes 42 and 43, the pump drawing water from an artesian well.

The position of the valve 36 will determine the direction of flow thru the element 31. When the system is operating as a heating system the valve will be in the position shown in Figure 1. The element 31 then operates as an evaporator and it is necessary to warm the gas before it passes to the compressor. When operating as a cooling system the element 31 will operate as a condenser. When the valve 36 is in the position shown in Figure 1, the pump will draw water from the artesian well and circulate it thru the heater 40, pipe 43, passage 38 in four way valve 36, pipe 33, coil 32, pipe 34, valve passage 37 and pipe 45 to waste. The pump 41 must deliver a sufficient volume of water to warm the air in duct 13 and in coil 32 without reducing the temperature of the water to the freezing point.

The pump 41 is operated by current supplied thru lines 48 and 49 which are connected to lead in lines 47 and 46. A thermostatically controlled switch 50 opens circuit thru lines 48 and 49 when the temperature of the incoming air is above the temperature of the well water.

Circuit to the motor for operating the pump 41 is controlled by a relay switch 51 which switch is controlled by current supplied thru lines 52 and 53, from the time clock 56.

A damper 55 in air duct 11 controls the amount of air supplied to the room. This damper is operated in response to a thermostat 54 in the room 10. In winter the thermostat 54 will be set to close the damper 55 when the room gets too warm and to open it when the room gets cold. In summer the thermostat will operate to open the damper when the room gets too warm and close it when the room gets cool enough.

In order to limit operation of the heating system to certain periods of the day only, and to prevent operation at the peak periods of the power company's operation demand, a timing clock 56 is provided. Assume that the peak period of current demand is between 4:30 and 8:30 p. m., and that the temperature desired in the room is 75 degrees F. The thermostat 54 will be set for 75 degrees. Then at some time prior to 4:30, say at 2:30 the time clock 56 will actuate thermostat 54 thru wires 65 and 66 in such a way that the thermostat is set for 80 degrees. A few minutes before 4:30 the time clock 56 will operate relay switches 51 thru wires 52 and 53 and relay switch 73 thru wires 67 and 68 to stop pump 41 and compressor 17. At the same time the time clock will operate motor 71 thru wires 69 and 70 to close damper 72 in the fresh air inlet 13.

The system may be converted into a cooling system by rotating shaft 75 thru 90 degrees by means of crank 74. Valves 20 and 36 are operated by crank 74 as are also valves 27 and 76 as will appear. On the end of shaft 75 is an arm 78 the ends of which are connected by links 79 and 80 with arms 81 and 82 to valves 27 and 76. At 77 is an expansion valve thru which refrigerant is expanded into the coil 26. When operating as a cooling system the valve 76 will be open and the valve 27 will be closed.

When operating as a cooling system the valves 20 and 36 will also be rotated thru a 90 degree arc so that passage 23 will connect pipes 19 and 22 and passage 24 will connect pipes 18 and 21; passage 38 in valve 36 will connect pipes 43 and 34 and passage 37 will connect pipes 33 and 45. Refrigerant from the compressor will now pass thru pipe 22 into coils 32. Water from pipes 34 and 33 will condense the refrigerant in the shell 31. This refrigerant is then expanded thru valve 77 into coils 26 where it takes up heat from the air passing over the coils to cool the air and warm the refrigerant.

When operating as a cooling system the clock is not operated since there usually are no peak load periods in the summer and consequently it is not necessary to limit capacity operation to certain portions of the day.

Whereas we have disclosed in the drawings, Figures 1 and 2, only the simple conditioning steps of preheating and reheating, there are many other simple steps in the heating cooling cycle which can be applied to this system.

In summer it is desirable in many installations using the split system to deliver dry air at a moderate temperature. To accomplish this it is expedient to install a reheating coil subsequent to the precooling and dehumidifying coils. If the conditioned air is desired at a moderate temperature, say 70 to 75 degrees, the water after leaving the precooling coils is warm enough for this purpose. The artesian or well water is then piped first thru the precooling coils countercurrently then thru the reheating coils countercurrently and then to the refrigeration condensers. An added advantage of this method is the reduced water temperature in the condensers, this reducing the power input to the compressors and increasing the refrigerating tonnage on the dehumidifying or refrigerant cooling coils, reducing the dew point produced by the system.

If air at a warmer temperature is desired than 70 to 75 degrees in summer an efficient method is to add on a secondary reheating coil thru which the hot refrigerant liquid is circulated countercurrently before passing thru the expansion valve and on to the dehumidyfying or refrigerant cooling coils. The use of colder liquid thru the expansion valves further reduces the dew point produced by the system.

A further advantage of this system is the use of the same coil as a superheat removal coil in winter, thus reducing the total amount of coil surface required for refrigerant condensing and air reheating in winter. By-passing the expansion valve is necessary.

Another simple but not so economical arrangement is to feed the summer reheating water coil described above with water from the refrigerant condensers. This water will be about 90 degrees, and will give 80 degree air delivery if necessary.

Another obvious addition to this system is a humidifying spray over the preheating coils in winter. Such a spray enhances the heat transfer from the coils and also provides cheap low temperature energy. The humidified air delivered can have a lower temperature and create an effect of warmth due to the increased moisture content at a reduced operating cost, since well water is ordinarily much cheaper than reverse cycle refrigerating energy.

The use of freon refrigeration in this cycle demands the arrangement of superheating and liquid reheating coils above the condensers so that the coil may be purged back to the compressors or trap. The winter water cooling refrigerant heating coils should be arranged to drain directly back to the compressors. The invention is deemed, therefore, to include these and other combinations not inconsistent with them.

It is also to be understood that the above modifications will be capable of many simple and intricate control schemes which may be used. For example, some of the well water may be sprayed over the warm side of the preheating coils in winter under control of the air temperature leaving these coils. For more extreme humidification when little out door air is needed for infiltration repression, well water may be sprayed over the superheat coils in a fine film under the control of the leaving air temperature or the humidity of the treated spaces. In summer it is obvious for an extreme degree of reheating without loss of energy that the amount of water going thru the precooling coils should be throttled as required to give the maximum air temperature leaving the unit.

It will be obvious to those skilled in the art that various changes may be made in the invention without departing from the spirit thereof, we, therefore, do not limit ourselves to the invention as shown in the drawings and described in the specification but only as set forth in the appended claims.

What we claim is:

1. A heating system comprising a compressor, a condenser and an evaporator, means for causing the air from the chamber to be heated to pass over the condenser to condense the gas therein and to warm the air, a water circulating pump connected to a source of water having a normal temperature within a few degrees of the temperature desired in the room, and means for transferring some of the heat from this water to the air prior to contact of the air with the said condenser.

2. In a system for heating a building with the reversed refrigerating cycle comprising a refrigerant compressor, condenser receiver and evaporator, means for withdrawing air from the chamber to be heated and circulating it in heat exchange relation with the said condenser to condense the refrigerant therein and warm the air, a water circulating pump having a natural source of supply at a temperature within a relatively few degrees of the temperature desired in the building, means for supplying outside air to the said building, means for pre-warming this outside air by the water from said pump and means for thereafter using said water as a heating means for the evaporated refrigerant in the said evaporator.

3. The combination with a heating system using the reversed cycle refrigerating pump, of an artesian well, a pump for drawing water from said well, means for using water from said well as a warming means for pre-warming the air supplied to the building to be heated, a refrigerant condenser in the said refrigerating cycle, means for utilizing the heat of condensation of the refrigerant vapor for further heating the air prior to its delivery to said building to be warmed.

4. A heating system of the kind described comprising in combination a refrigerating cycle, means for circulating air from and into a chamber to be heated, means for heating the air so circulated by heat developed by the compressor of the refrigerator system, means for supplying artesian water to warm evaporated refrigerant in said refrigerating system, means for supplying outside air to the chamber to be heated and means for pre-warming this air by the said artesian water prior to its passage to the refrigerant evaporator.

5. A system of the kind described comprising the combination with a room to be heated of means for circulating air from and back into the room, means for heating said air, means for supplying additional air to said room, means for circulating artesian water in heat exchange relation with said entering air to pre-warm said air, and timing means for maintaining operation of said heating means and said water circulating means only at predetermined times in the day.

6. A heating system for a room comprising a compressor, a condenser and an evaporator, means for causing the air from the room to be heated to pass over the condenser to condense the refrigerating gas delivered thereto by the compressor and to warm the air, means for supplying atmospheric air to said room and for causing it to pass over said condenser prior to its entry into the room and a pump for circulating water in heat exchange relation with the atmospheric air entering the room whereby some of the heat from the water is imparted to the incoming air prior to contact of said air with the said condenser.

KEMPER P. BRACE.
ROBERT B. P. CRAWFORD.